(12) United States Patent
Oldani

(10) Patent No.: US 9,249,956 B1
(45) Date of Patent: Feb. 2, 2016

(54) HOUSING FOR LED LIGHTING BOARD

(75) Inventor: Charles S. Oldani, Saint Louis, MO (US)

(73) Assignee: KOLLER ENTERPRISES, INC., Fenton, MO (US)

( * ) Notice: Subject to any disclaimer, the term of this patent is extended or adjusted under 35 U.S.C. 154(b) by 459 days.

(21) Appl. No.: 13/608,520

(22) Filed: Sep. 10, 2012

(51) Int. Cl.
*F21V 21/00* (2006.01)
*F21V 17/10* (2006.01)
*F21V 17/06* (2006.01)
*F21V 19/00* (2006.01)
*F21V 21/26* (2006.01)

(52) U.S. Cl.
CPC ............... *F21V 17/107* (2013.01); *F21V 17/06* (2013.01); *F21V 19/0015* (2013.01); *F21V 21/26* (2013.01)

(58) Field of Classification Search
CPC ......... F21V 17/00; F21V 17/04; F21V 17/06; F21V 17/08; F21V 17/107; F21V 17/16; F21V 17/164; F21V 17/18; F21V 19/00; F21V 19/001; F21V 19/0015; F21V 19/003; F21V 19/004; F21V 21/00; F21V 21/108; F21V 21/116; F21V 21/14; F21V 21/26; F21V 21/30
See application file for complete search history.

(56) References Cited

U.S. PATENT DOCUMENTS

2012/0106148 A1* 5/2012 De Silva .................... 362/235
2012/0113628 A1* 5/2012 Burrow et al. ............... 362/184

\* cited by examiner

*Primary Examiner* — Bao Q Truong
(74) *Attorney, Agent, or Firm* — Stinson Leonard Street LLP

(57) ABSTRACT

A mounting structure and associated mounting bracket for a board containing multiple LED lights is the subject of this invention. It is particularly designed for use in converting a conventional fluorescent tube housing to an LED board housing. The mounting structure includes arms which are received in a support bracket and are held by the bracket at a desirable angle. LED boards may be quickly and easily mounted to or removed from the mounting structure which in turn is easily removable from the support bracket.

30 Claims, 4 Drawing Sheets

HOUSING FOR LED LIGHTING BOARD

CROSS-REFERENCE TO RELATED APPLICATIONS

None

STATEMENT REGARDING FEDERALLY SPONSORED RESEARCH OR DEVELOPMENT

Not applicable.

BACKGROUND OF THE INVENTION

Field of the Invention

Light emitting diodes (LED) have become a popular tool in lighting pathways, walkways, and the like where the location dictates low-voltage power (i.e., battery), low voltage is desired for energy savings or relatively soft low-level lighting is an aesthetic choice. For example, enclosed parking lots may utilize LED lights to guide pedestrians to stairs or an elevator. In some instances existing fluorescent lights are being converted to LED with a number of LEDs mounted on a single board.

BRIEF SUMMARY OF THE INVENTION

The present invention is directed to a structure for mounting an LED board inside a housing at a desirable angle, generally approximately 45 degrees. The invention can be utilized to mount LED boards in an existing housing that has previously been utilized for fluorescent tubes as well as new housings especially designed for LED board use. The structure of the invention includes two arms arranged in a generally V shape with opposing planar surfaces on either side of the V and a bridge which joins the two surfaces at the apex of the V. The invention also includes a bracket for mounting the aforementioned structure to a housing with the bracket including a central section which is adapted to receive a fastener, a first link which extends from the central section at the desired angle and receives one end of the LED support structure and a second link also extending at an angle from the central section and adapted to receive a second arm of the support structure. The apparatus provides for quick conversion of a conventional fluorescent housing to a housing for LED boards and mounts the boards at the proper angle for maximum light distribution and in a manner which accommodates easy service for maintenance purposes.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF THE PREFERRED EMBODIMENT

Figure 1:
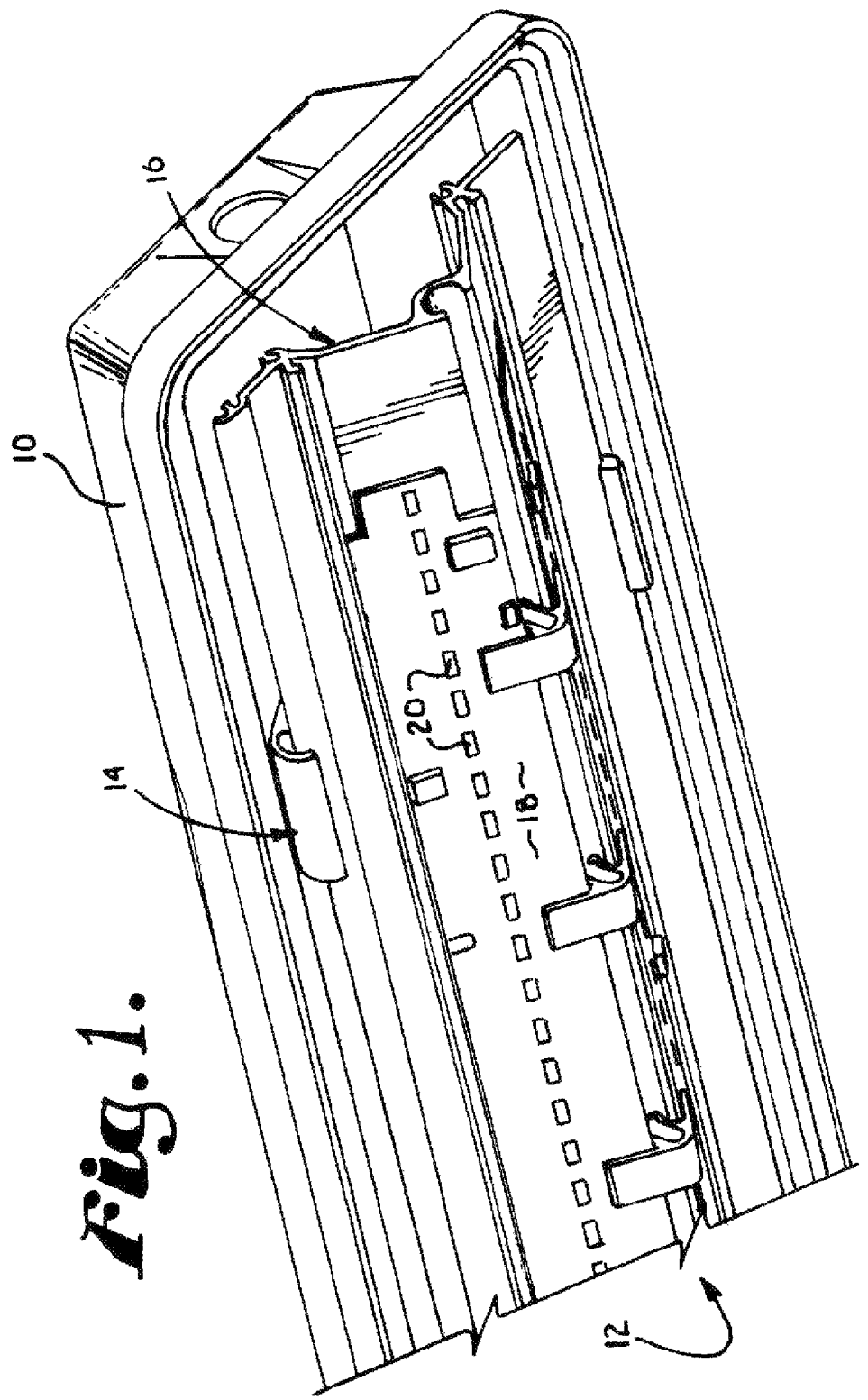
FIG. 1 is a perspective view of a housing for receiving the mounting bracket and LED support structure.

Referring to FIG. 1, a typical housing for fluorescent lighting is designated by the numeral 10. The apparatus of the present invention for mounting LED boards within housing 10 is designated generally by the numeral 12 and includes a mounting bracket 14 and mounting structure 16. Typically housing 10 is mounted on or parallel to a surface of a building or other structure at a height of 8 to 10 feet above the floor. Mounting structure 16 is designed to hold two LED boards 18 which include a number of light emitting diodes.

Figure 2:
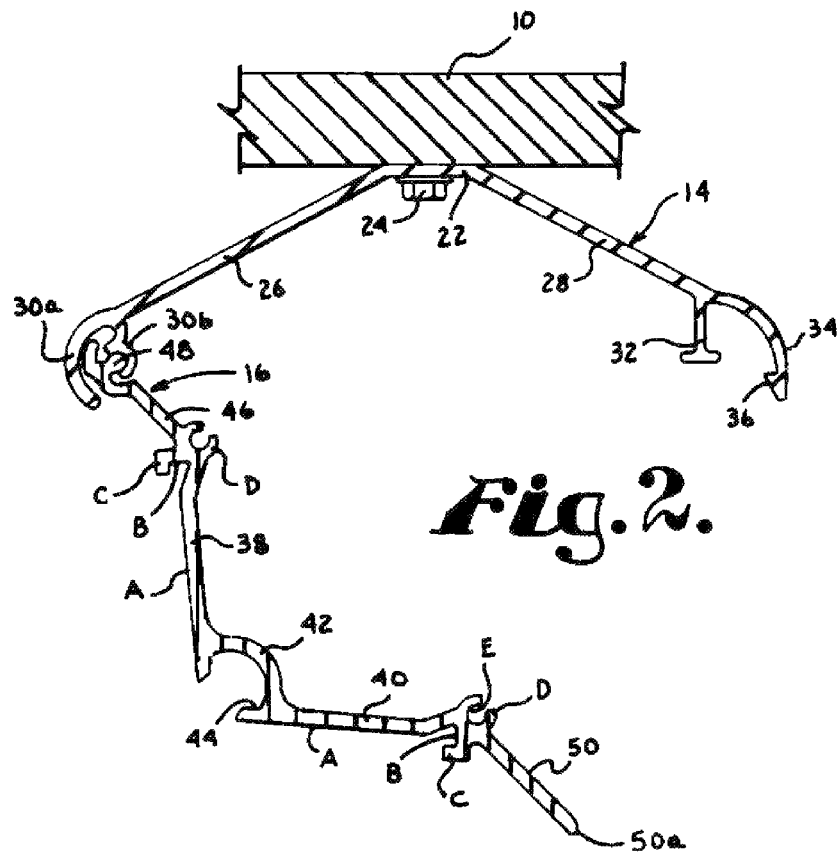
FIG. 2 is a vertical cross-sectional view taken through the housing, bracket, and support structure with the support structure in an open position.

Referring to FIG. 2 in conjunction with FIG. 1, mounting bracket 14 comprises a generally flat horizontal center section 22 which receives a bolt 24 for securing the bracket to housing 10. The bracket includes first and second links 26 and 28 which are rigid with and extend from the central section 22 at an acute angle. First link 26 terminates in a pair of unmatched hooks 30a and 30b which present a socket 31 for receiving mounting structure 16. The second link 28 terminates in an inverted T 32 and a curved arm 34 which presents a catch 36. Catch 36 receives a portion of mounting structure 16. The width of bracket 14 relative to the cross section shown in FIG. 2 can be understood from the perspective view of FIG. 1. It is to be understood that bracket 14 may be of any width and could extend the entire length of the LED boards 18.

Figure 3:
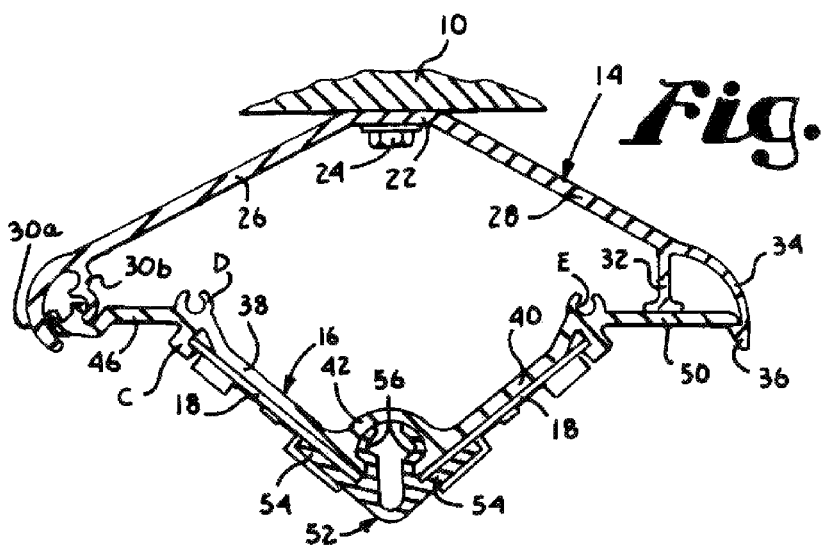
FIG. 3 is a cross-sectional view substantially similar to FIG. 2 but with the support structure in latched position and with the LED boards mounted on the support structure.

Referring now to FIGS. 2 and 3, details of the mounting structure 16 will be described. Mounting structure 16 is formed in a general V shape with a first arm 38 which extends at approximately a 45 degree angle relative to the horizontal and a second arm 40 extending at the same angle so that the two arms form an approximately 90 degree angle. These arms are joined at the apex of the V by a bridge 42 which is a curved surface that in cooperation with arms 38 and 40 present a receptacle 44. Arms 38 and 40 are identical in construction with the exception of their terminal ends. The common components of the arms will be described utilizing the same reference letters. Each arm has a planar surface A one end of which cooperates with bridge 42 to form receptacle 44. The other end of each arm presents a slot B and an adjoining lip C. Opposite slot B is spur D which presents a socket E. Those components of first arm 38 which are not common with second arm 40 will now be described. A planar section 46 integral with the spur D of arm 38 extends from the socket to form truncated ball 48 which is received in the socket 31 of first link 26. Arm 40 includes a planar section 50 which is of greater length than planar section 48 and terminates in a rounded end 50a. The arm is sufficiently resilient that it can be pushed past catch 36 to provide a snap fit. Also, a portion of planar section 50 engages the horizontal surface of inverted T 32 which forms a stop that precludes the arm from moving farther than desired.

Figure 5:
FIG. 5 is a vertical elevational view of a retainer which is received in a receptacle formed by the mounting structure for retaining one edge of each of two LED boards.
Figure 6:
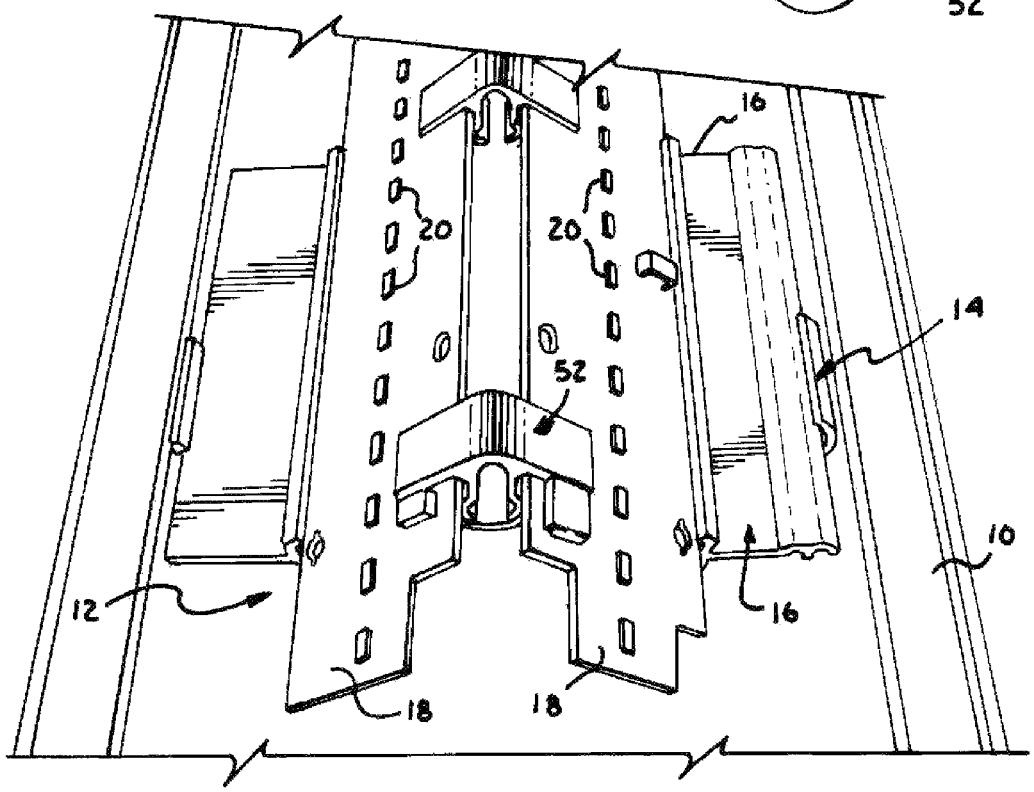
FIG. 6 is a bottom perspective view of the LED mounting structure illustrating two LED boards held in place by two retainers.

Referring to FIGS. 3 and 5, a retainer 52 is received by receptacle 44 to hold the LED boards 18 mounted on planar surfaces A in place. Each retainer 52 comprises opposed wings 54 which overlie the LED boards and resilient legs 56 which engage the walls of receptacle 44.

Figure 7:
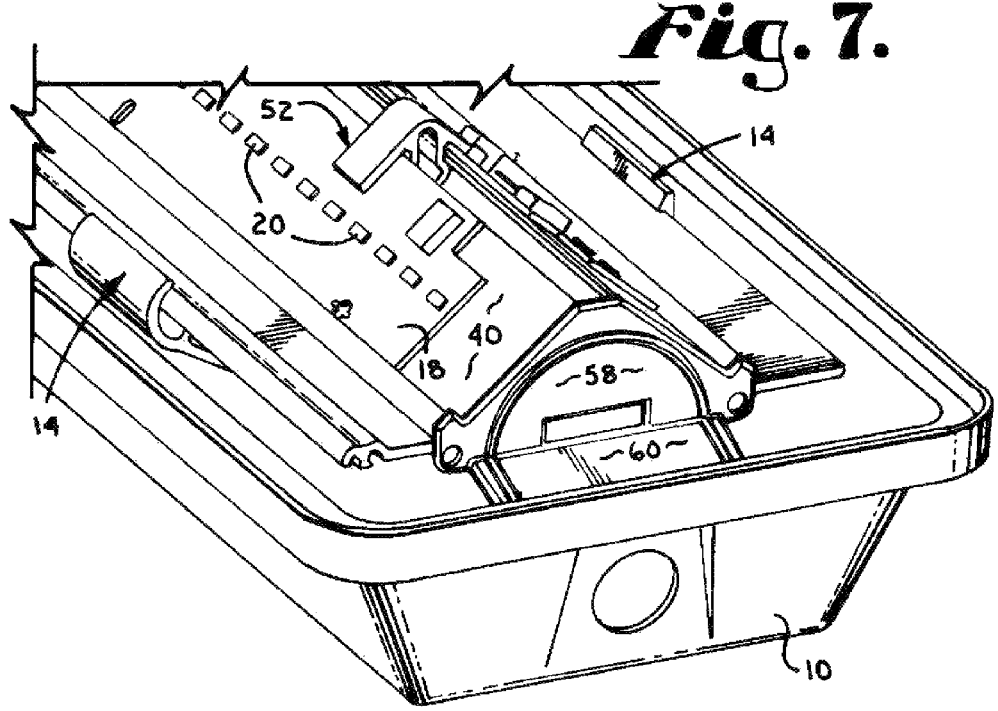
FIG. 7 is a bottom perspective view showing the end plate which is received by the arms of the mounting structure.

Referring to FIG. 7, an end cap 58 is received by sockets E and includes a deflector surface 60. Housing 10 is shown in an inverted position in FIG. 7 rather than its normal position when in use as shown in FIG. 1.

Figure 4:
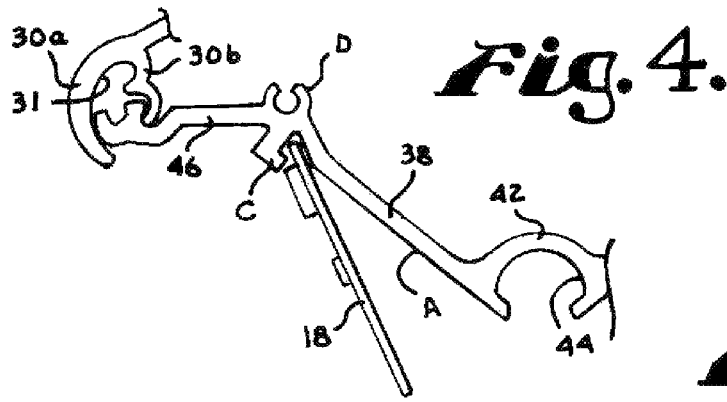
FIG. 4 is an enlarged fragmentary vertical elevation of the support structure showing an LED board being positioned for retention by one of the structure arms.

In use, housing 10 is mounted directly to or hung from the ceiling or other overhead support for the surface to be illuminated by LED lights 20. Mounting bracket 14 is secured to the housing by bolt 24 as previously described. Ball 48 is rotatable in socket 31 to accommodate movement of arm 40 toward link 28 where it is locked in place by catch 36. LED boards 18 are secured to mounting structure 16 by slipping each board into slot B of arms 38 and 40, positioning the boards flat against planar surfaces A and then inserting retainer 52 into receptacle 44. The manner of insertion of the LED board into the slot is shown in FIG. 4. It is to be noted that the throat or opening of slot B has a dimension which is slightly greater than the thickness of LED board 18 thus allowing for lower tolerances with regard to both components than would be the case if planar surface A extended beneath lip C. However, the distance between a phantom extension of surface A to directly beneath lip C will be approximately equal to the thickness of board 18 to ensure a tight fit. Retainer 52 is formed from a resilient memory material such as plastic so that the legs may be compressed for insertion into the throat of receptacle 44 and then released to engage the inner surface of the receptacle.

Planar section 50 is formed from a resilient memory material such as plastic so that it can easily be forced past catch 36 to form a tight snap fit for mounting structure 16. This also accommodates quick release of mounting structure 16 by simply pulling on arm 50 to allow structure 16 to be moved downward for maintenance of the components (not shown) within housing 10.

It is to be understood that reference to the inverted V-shaped mounting bracket 14 is intended to be broadly construed and encompass any configuration where two generally downwardly sloping members are joined at the apex. This would include a configuration where there is no well defined central bracket section 22 but rather first and second links which directly intersect or a central section that is other than planar. While bracket links 26 and 28 are preferably disposed at an angle of approximately 45 degrees relative to the horizontal, this angle could vary from 30-60 degrees. It would also encompass a bracket that is integrally formed with housing 10.

Similarly, the term "V-shaped" as applied to mounting structure 16 is intended to encompass any configuration where opposed sloping surfaces extend at approximately 90 degrees relative to each other and at approximately 45 degrees relative to the horizontal and present planar surfaces for mounting LED boards 18. The sloping surfaces could, however, vary from 30 degrees to 60 degrees relative to the horizontal. Rather than a distinct bridge 42 as shown in the preferred embodiment, the bridge may be formed by the intersection of planar surfaces A. Also bridge 42 could include an integrally formed retainer for boards 18 eliminating the need for separate retainers 52. As will be discussed below, bridge 42 may also be formed to present a third planar surface which receives an additional LED board.

Retainers 52 may be individual components as shown in FIGS. 1-3 or may be of a length extending the entire length of the associated LED board. It should also be understood that other types of retainers may be employed without departing from the invention including threaded fasteners. It is preferable that retainer arms 54 be formed so they are "off parallel" relative to planar surfaces A by 2-4 degrees so they add spring tension to the board once the latter is in place on surface A.

Retainers 52 may have flared ends on wings 54 to facilitate their removal. Another alternative construction for retainer 52 is to eliminate legs 56 and instead construct wings 54 with an integral section which extends from the terminus of one wing, around the edge of one arm, forming a recessed connecting section within the cavity formed by bridge 42 and then extending around the other arm to join the other wing.

All of the components may be formed from aluminum, thermal plastic, or other heat resistant material. One of the advantages of mounting structure 14 is that it serves as a heat sink to reduce the heat output of the fixture.

Figure 8:
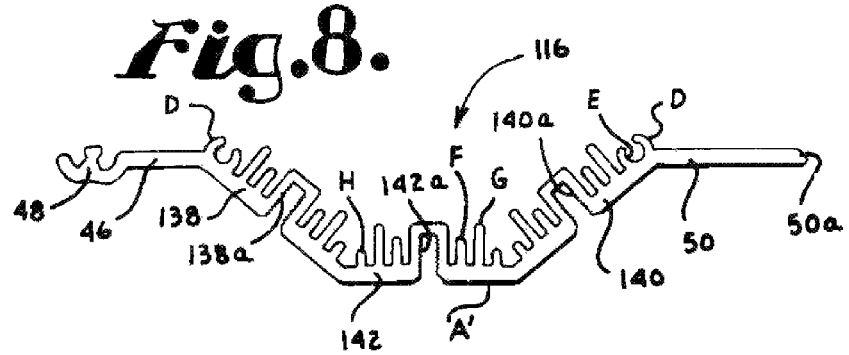
FIG. 8 is an elevational view of an alternative configuration for the mounting structure.

An alternative embodiment of the invention is illustrated in FIG. 8 where the mounting structure is designated generally by the numeral 116 and distinguished in part by a bridge 142 which forms a third planar surface A' for receiving an additional LED board (not shown) substantially identical to boards 18. A first arm 138 and a second arm 140 generally correspond to arms 38 and 40 described in the preferred embodiment. Arm 138 is integrally formed with a planar section 46 as previously described for the preferred embodiment and arm 140 is integral with a second planar section 50 as previously described. Rather than utilization of a retainer 52 as described for the preferred embodiment, each of arms 138, 140, and bridge section 142 are formed with an integral threaded socket 138a, 140a, and 142a, respectively, for receiving a complimentary threaded fastener for retaining an LED board in place on their planar surfaces. The backside (side opposite the planar surfaces) of arms 138 and 140 as well as bridge 142 are characterized by a series of projections F, G, and H of varying height which greatly increase the surface area of the mounting structure and thus its heat retention capabilities. Placement and utilization of structure 116 is identical to structure 16 as previously described except for the utilization of threaded sockets 138a, 140a, and 142a to receive appropriate fasteners (not shown) for mounting LED boards 18. It is to be understood that utilization of projections F, G, and H could be employed with the mounting structure 16 described in the preferred embodiment. It is further to be understood that the threaded sockets 138a, 140a, and 142a could be employed in the preferred embodiment rather than utilizing retainer 52 and slots B and lips C as previously described.

From the foregoing it will be seen that this invention is one well adapted to attain all ends and objectives herein-above set forth, together with the other advantages which are obvious and which are inherent to the invention.

Since many possible embodiments may be made of the invention without departing from the scope thereof, it is to be understood that all matters herein set forth are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. Structure for mounting opposed LED boards in a housing having a support bracket with first and second support links, said structure comprising:
   a first arm adapted to be received in a first link of said support bracket;
   a second arm adapted to be received in a second link of said support bracket which second link is opposite said first link;
   a generally V-shaped member rigid with and extending between said first and second arms,
      said V-shaped member presenting opposing planar surfaces with each of said surfaces adapted to receive and retain at least one LED board,
      said V-shaped member further including a bridge joining said planar surfaces; and
   a retainer received by said bridge for holding said LED boards to said planar surfaces.

2. The invention of claim 1, wherein said bridge presents a receptacle at the apex of said V and said receptacle receives said retainer.

3. The invention of claim 2, wherein said retainer presents opposed wings each of which receives an edge of one of said LED boards.

4. The invention of claim 3, wherein said opposed wings are biased so as to place tension on said LED boards when in position to hold the latter.

5. The invention of claim 3, wherein said retainer comprises resilient legs which project into said receptacle when compressed and engage the walls of said receptacle when released.

6. Structure for mounting opposed LED boards in a housing having a support bracket with first and second support links, said structure comprising:
   a first arm adapted to be received in a first link of said support bracket;
   a second arm adapted to be received in a second link of said support bracket which second link is opposite said first link;
   a generally V-shaped member rigid with and extending between said first and second arms,
      said V-shaped member presenting opposing planar surfaces with each of said surfaces adapted to receive and retain at least one LED board,
      said V-shaped member further including a bridge joining said planar surfaces; and
   wherein each of said planar surfaces is formed with at least one lip presenting a slot for retaining at least a portion of one edge of one LED board.

7. The invention of claim 6, wherein the dimension of the opening of said slot is greater than the thickness of said LED board.

8. The invention of claim 1, wherein said bridge presents a third planar surface extending between said aforementioned planar surfaces at said V.

9. The invention of claim 1, wherein is included an LED board mounted on each of said planar surfaces.

10. The invention of claim 1, wherein said support bracket comprises a central section and first and second links are rigid with said central section and extend therefrom at an acute angle.

11. Structure for mounting opposed LED boards in a housing having a support bracket with first and second support links, said structure comprising:
   a first arm adapted to be received in a first link of said support bracket;
   a second arm adapted to be received in a second link of said support bracket which second link is opposite said first link;
   a generally V-shaped member rigid with and extending between said first and second arms,
      said V-shaped member presenting opposing planar surfaces with each of said surfaces adapted to receive and retain at least one LED board,
      said V-shaped member further including a bridge joining said planar surfaces; and
   wherein one of said links presents a receptacle for receiving one end of one of said arms.

12. The invention of claim 11, wherein said receptacle receives said one end of said arm in hinged relationship.

13. The invention of claim 12, wherein the other of said links includes a catch for receiving one end of the other of said arms in locking relationship.

14. The invention of claim 1, wherein said bridge comprises a third planar section for receiving a third LED board at the apex of said V-shaped member.

15. The invention of claim 14, wherein each of said planar surfaces includes a threaded socket for receiving a complementary threaded fastener for holding said LED boards in place.

16. The invention of claim 1, wherein each of said arms includes a plurality of fingers projecting from the side of the arm opposite said planar surface.

17. The invention of claim 16, wherein said bridge comprises a third planar section presenting a third planar surface for receiving a third LED board at the apex of said V-shaped member, said third planar section includes a plurality of fingers projecting from the side opposite said third planar surface.

18. A bracket for mounting an LED support structure in a housing, said bracket comprising:
   a central section adapted to receive a fastener for joining said bracket to said housing in a generally horizontal plane;
   a first link integral with said central section and extending from said central section at an acute angle,
   said first link having a receptacle at the end opposite said central section for receiving said LED support structure in hinged relationship; and
   a second link integral with said central section and extending from said central section at an acute angle in the opposite direction from said first link,
   said second link presenting a catch at the end opposite said central section for receiving said LED support structure.

19. A bracket as set forth in claim 18, wherein said receptacle presents a socket for receiving a complementary shaped end of said support structure.

20. A bracket as set forth in claim 18, wherein said second link includes a generally horizontal stop for contact with said structure when said structure is received by said catch.

21. Apparatus for mounting an LED board in a housing, said apparatus comprising:
   a bracket for joining said apparatus to said housing, said bracket comprising a central section adapted to receive a fastener, a first link integral with said central section and extending from said central section at an acute angle, and a second link integral with said central section and extending from said central section at an acute angle in the opposite direction from said first section wherein said two sections present an inverted V with said central section at the apex of said V;
   a first arm adapted to be received in said first link of said support bracket;
   a second arm adapted to be received in said second link of said support bracket;
   a generally V-shaped member rigid with and extending between said first and second arms, said V-shaped member presenting opposing planar surfaces with each of said surfaces adapted to receive and retain at least one LED board, said V-shaped member further including a bridge joining said planar surfaces; and a retainer received by said bridge for holding said LED boards to said planar surfaces.

22. The invention of claim 21, wherein said bridge presents a receptacle at the apex of said V and said receptacle receives said retainer.

23. The invention of claim 22, wherein said retainer presents opposed wings each of which receives an edge of one of said LED boards.

24. The invention of claim 23, wherein said retainer comprises resilient legs which project into said receptacle when compressed and engage the walls of said receptacle when released.

25. The invention of claim 21, wherein said bridge presents a third planar surface extending between said aforementioned planar surfaces at said V.

26. The invention of claim 21, wherein is included an LED board mounted on each of said planar surfaces.

27. The invention of claim 21, wherein one of said links presents a receptacle for receiving one end of one of said arms.

28. The invention of claim 27, wherein said receptacle receives said one end of said arm in hinged relationship.

29. The invention of claim 28, wherein the other of said links includes a catch for receiving one end of the other of said arms in locking relationship.

30. The invention of claim 21, wherein said bridge comprises a third planar section for receiving a third LED board at the apex of said V-shaped member.

* * * * *